(12) United States Patent
McGregor, Jr. et al.

(10) Patent No.: US 8,677,123 B1
(45) Date of Patent: Mar. 18, 2014

(54) METHOD FOR ACCELERATING SECURITY AND MANAGEMENT OPERATIONS ON DATA SEGMENTS

(75) Inventors: John Patrick McGregor, Jr., Pittsburgh, PA (US); Matthew N. White, Pittsburgh, PA (US)

(73) Assignee: Trustwave Holdings, Inc., Chicago, IL (US)

( * ) Notice: Subject to any disclaimer, the term of this patent is extended or adjusted under 35 U.S.C. 154(b) by 1898 days.

(21) Appl. No.: 11/441,613

(22) Filed: May 26, 2006

Related U.S. Application Data

(60) Provisional application No. 60/684,772, filed on May 26, 2005.

(51) Int. Cl.
*H04L 9/00* (2006.01)

(52) U.S. Cl.
USPC ............. 713/168; 713/2; 713/160; 380/28; 380/37; 380/44; 725/31

(58) Field of Classification Search
USPC ........ 713/168, 160, 2; 380/28, 37, 44; 725/31
See application file for complete search history.

(56) References Cited

U.S. PATENT DOCUMENTS

| | | | |
|---|---|---|---|
| 5,642,421 A * | 6/1997 | Gray et al. | .......... 713/160 |
| 6,246,768 B1 | 6/2001 | Kim | |
| 6,751,319 B2 | 6/2004 | Luyster | |
| 6,760,779 B1 | 7/2004 | Riceman | |
| 6,772,346 B1 | 8/2004 | Chess et al. | |
| 6,845,159 B1 | 1/2005 | Domstedt et al. | |
| 6,937,727 B2 | 8/2005 | Yup et al. | |
| 6,944,688 B1 | 9/2005 | Batcher | |
| 6,948,067 B2 | 9/2005 | Hawkes et al. | |
| 6,950,517 B2 | 9/2005 | Hawkes et al. | |
| 6,961,927 B1 | 11/2005 | Erb et al. | |
| 6,978,378 B1 | 12/2005 | Koretz | |
| 6,989,773 B2 | 1/2006 | Wee et al. | |
| 6,996,725 B2 | 2/2006 | Ma et al. | |
| 7,016,908 B2 | 3/2006 | Kataoka et al. | |
| 7,031,972 B2 | 4/2006 | Ren et al. | |
| 7,042,988 B2 | 5/2006 | Juitt et al. | |
| 7,043,686 B1 | 5/2006 | Maruyama et al. | |
| 7,046,802 B2 | 5/2006 | Rogaway | |
| 7,051,152 B1 | 5/2006 | Danilak | |
| 2001/0050989 A1 | 12/2001 | Zakiya | |
| 2003/0123645 A1* | 7/2003 | Comisky | .......... 379/399.01 |
| 2003/0198345 A1 | 10/2003 | Van Buer | |
| 2003/0202658 A1 | 10/2003 | Verbauwhede | |

(Continued)

*Primary Examiner* — Beemnet Dada
*Assistant Examiner* — Sayed Beheshti Shirazi
(74) *Attorney, Agent, or Firm* — Hanley, Flight & Zimmerman LLC

(57) ABSTRACT

A method for improving the performance of data storage and transmission systems involves applying a transformation to one or a plurality of aligned data segment(s) prior to or subsequent to the execution of data management operations. The transformation effectively reduces the number of bits in the data segment that must be employed by the data management operation processing. Data management operations performed on a data segment may include but are not limited to cryptographic security operations and data comparison operations. Since the computation requirements of data management operations can decrease as the bit lengths of input data decrease, the transformation can reduce the latencies of data management operations in hardware or software. Furthermore, performing the transformation on a data segment does not reduce the number of bits needed to encode the data segment, thus maintaining the alignment of a plurality of data segments.

54 Claims, 6 Drawing Sheets

(56) References Cited

U.S. PATENT DOCUMENTS

| | | |
|---|---|---|
| 2003/0223580 A1 | 12/2003 | Snell |
| 2004/0047466 A1 | 3/2004 | Feldman et al. |
| 2004/0107170 A1* | 6/2004 | Labrou et al. .................. 705/64 |
| 2004/0120518 A1 | 6/2004 | Macy et al. |
| 2004/0184602 A1 | 9/2004 | Nadehara |
| 2004/0202317 A1* | 10/2004 | Demjanenko et al. .......... 380/28 |
| 2004/0210320 A1* | 10/2004 | Pandya ............................ 700/1 |
| 2005/0102504 A1* | 5/2005 | Le et al. ........................ 713/160 |
| 2005/0138366 A1* | 6/2005 | Loh et al. ...................... 713/160 |
| 2005/0226408 A1 | 10/2005 | Hotz |
| 2005/0271204 A1* | 12/2005 | Chu ................................ 380/44 |
| 2006/0002548 A1 | 1/2006 | Chu |
| 2006/0026377 A1* | 2/2006 | Sikdar et al. .................. 711/170 |
| 2006/0039555 A1* | 2/2006 | Lee et al. ........................ 380/37 |
| 2006/0072746 A1* | 4/2006 | Tadepalli ........................ 380/37 |
| 2010/0185843 A1* | 7/2010 | Olarig et al. .................... 713/2 |

\* cited by examiner

METHOD FOR ACCELERATING SECURITY AND MANAGEMENT OPERATIONS ON DATA SEGMENTS

This application claims the benefit under 35 U.S.C. §119 (e) of provisional application Ser. No. 60/684,772 filed May 26, 2005 entitled Method For Accelerating Security And Management Operations On Data Segments which is incorporated herein by reference.

BACKGROUND

A deterministic, lossless, and efficiently invertible data compression function F is a transformation that accepts an input data segment A of length $N_A$ bits and outputs a data segment B of length $N_B$ bits. The data segment B can be applied as the input to an inverse function $F^{-1}$ that outputs the aforementioned data segment A. The operations of F and $F^{-1}$ are illustrated in FIG. 1. The utility of the compression function is the fact that $N_B$ may be less than $N_A$. Thus, if A were to be transmitted over a network or stored to data storage media, F could be employed to reduce the bandwidth consumed during the transmission of A or to reduce the data storage media space required to maintain A, respectively. If F is effective and A has low entropy, it is likely that $N_B$ is less than $N_A$. However, if F is poorly designed or A has high entropy, $N_B$ may be greater than or equal to $N_A$; that is, in some cases, F can actually inflate the data segment.

It is well known that compression functions can improve the performance of data management operations. In particular, compression can improve the performance of secure data storage and transmission systems. Such security systems often depend on cryptographic operations to achieve critical security goals. Examples of common cryptographic operations include (but are not limited to) symmetric-key encryption algorithms, asymmetric-key encryption algorithms, keyed hash functions, and digital signatures. The latencies of most conventional cryptographic operations depend on the size of the data (in bits) applied as inputs to the operations. That is, as the size of the input increases, the latency of a cryptographic operation also increases. Thus, by compressing the input data prior to cryptographic processing, the latency of the cryptographic operation decreases, and the performance of the secure system increases.

To illustrate this concept using a practical example, consider a network transaction in which the confidentiality of transmitted data is ensured to some degree by a secure symmetric-key encryption algorithm such as the Advanced Encryption Standard (AES) or the Data Encryption Standard (DES). These two publicly-known encryption algorithms accept an arbitrarily-sized plaintext P (which is the data to be encrypted) and a fixed-length secret key K as inputs, and the algorithms output an encrypted ciphertext C that is approximately the same size as the input plaintext. Furthermore, for each of these encryption algorithms, there is a corresponding decryption algorithm that accepts a ciphertext C and a secret key K as inputs and that outputs a plaintext P. The process of encryption and decryption is illustrated in FIG. 2. If the encryption algorithm is secure, then given the ciphertext C without knowledge of the secret key K, a passive adversary cannot feasibly compute P.

In the example network transaction, a sender and a receiver share a secret key K that was securely established and securely distributed to the two parties prior to the current transaction. The sender can employ the secret key to encrypt a message P and obtain the encrypted result C. The sender then transmits the message to the receiver, and the receiver may use his copy of the secret key K using the appropriate public decryption algorithm to decrypt C and obtain P.

Compression can be used to improve the performance of such a system by reducing the amount of data to be encrypted and decrypted and by reducing the amount of data to be transmitted. A secure network transaction that employs compression is illustrated in FIG. 3. By compressing the plaintext P using the compression function F prior to encryption to obtain P', where the bit length of P' is smaller than that of P, the amount of computation required to encrypt the plaintext can be reduced significantly. Thus, if the computation required to compress P plus the computation required to encrypt P' (which is P in compressed form) does not exceed the computation required to encrypt P in uncompressed form, then performance speedups can be realized by the sender. Similarly, if the computation required to decrypt the received message C' plus the computation required to decompress the decrypted result P' using the decompression function F' does not exceed the computation required to decrypt C in uncompressed form, then performance speedups can be realized by the receiver.

For the encryption algorithms cited above, the output ciphertext C is of size (i.e., bit length) approximately equal to that of input plaintext P. Thus, encrypting the compressed plaintext P' yields an output ciphertext C' that is likely smaller than the ciphertext C. Therefore, by compressing the plaintext prior to encryption, the network transmission requirements involved in sending the ciphertext can be reduced, which can lead to improved network performance and to improved system performance.

Many existing methods, such as the IP Payload Compression Protocol (IPComp) and common file encryption utilities, employ compression algorithms to reduce the length of arbitrarily-sized data segments prior to the application of a data management operation such as encryption or a data comparison. A variety of lossless compression algorithms can be used in these methods; some algorithms are designed for high compression and/or decompression speed, and some algorithms are designed to achieve high compression ratios. A compression ratio for a data segment is simply the size of the data segment divided by the size of the data segment in compressed form.

Existing compression methods effectively accelerate data management operations for many applications, but in certain situations, these methods can lead to performance degradation. Consider a scenario involving random access to some quantity of stored data, such as a file. In many applications, it is desirable to specify a particular segment of data to be accessed within a file beginning at a particular logical address within that file. For this reason, most file systems are designed to facilitate fast access to a range of data given a starting address within an uncompressed file. If the file is stored in compressed form, however, a significant portion (if not all) of the file may need to be read and decompressed before the desired data segment within the file can be accessed. Thus, for typical files, this decompression can lead to serious performance loss.

More sophisticated compression schemes can alleviate this problem to some degree by providing efficient compressed data indexing mechanisms, but other performance problems still remain. Specifically, due to the characteristics of compression algorithms and compression encodings, when new data is written to an arbitrary location within a file that is stored in compressed form, much of the file may need to be decompressed and then re-compressed in order to correctly encode the modified file containing the newly written data. If file write operations are frequent, the performance loss resulting from this issue in conventional systems can be significant.

SUMMARY OF THE INVENTION

The present invention comprises (i) a transformation performed on one or a plurality of data segment(s) prior to being subjected to data management operations and (ii) a method for changing the data management operation inputs to represent a certain subset of bits of the transformation output. The present invention may be implemented in software, in hardware, or in a combination of software and hardware. The transformation may reduce the computation requirements of data management operations by reducing the number of bits that are directly processed by the data management operations without reducing the number of bits used in the logical encoding of the data following the transformation. By effectively decreasing computation requirements, the present invention improves performance by reducing data management operation latencies and by improving data management operation throughputs. Furthermore, by not reducing the number of bits used to encode the data segment, the present invention does not disrupt the alignment of a plurality of contiguous data segments that are subjected to data management operations.

The transformation of the present invention is any transformation function that accepts as an input the logical representation of a data segment and that outputs a new data segment such that: (1) the number of bits involved in encoding the logical representation of the input (original) data segment does not exceed that of the outputted (transformed) data segment; and/or (2) the outputted data segment consists two ordered sets of bits, where the first set is processed by the relevant data management operations, where the number of bits in the first set is fewer than or is equal to the number of bits involved in the encoding of the logical representation of the outputted data segment, and where each bit in the second set is (i) not subjected to the relevant data management operations, is (ii) independent of the values of the bits in the aforementioned first set, and is (iii) independent of the values of the bits in the logical representation of the input data segment. Given the output of this transformation, the present invention uses the first ordered set of bits produced by the transformation as the input to the data management operations (instead of using the original data segment). Preferably, the transformation is feasibly invertible.

A specific instance of a transformation of the present invention is a method that (i) compresses a segment of data using a lossless compression algorithm, (ii) appends (to the compressed data) a value of fixed size that represents the bit length of the compressed data, and (iii) appends (to the compressed data) random bits such that the sum of the bit lengths of the logical encodings of the compressed data, of the compressed data length, and of the random bits is equal to the bit length of the original data segment. Given this transformation, the inputs to the data management operations would be changed from the original data segment to a sequence of bits comprising the compressed data, the bit length of the compressed data, and possibly a subset of the random bits.

In accordance with an aspect of the present invention, a computer implemented data processing method comprises inputting a first data segment of a first bit length into a transformation algorithm to produce a second data segment of a second bit length; if the first bit length is equal to or less than the second bit length, performing one or more data management operations on the first data segment producing a third data segment of a third bit length and storing the third data segment in a first memory location associated with the first data segment; if the first bit length is greater than the second bit length, appending one or more padding bits to the second data segment to produce a fourth data segment having a fourth bit length greater than or equal to a minimum input size to the one or more data management operations, performing the one or more data management operations on the fourth data segment producing a fifth data segment of a fifth bit length, if the fifth bit length is less than the first bit length, appending one or more padding bits to the fifth data segment to produce a sixth data segment having a sixth bit length equal to the first bit length and storing the sixth data segment in the first memory location.

In accordance with another aspect of the present invention, the computer implemented data processing method further comprises storing, when the third bit length is greater than the first bit length, a first portion of the third data segment in the first memory location and a second portion of the third data segment in metadata associated with the first memory location where the first and second portions may constitute the third data segment in its entirety. In yet another aspect of the present invention, the computer implemented data processing method may additionally comprise storing, when the fifth bit length is greater than the first bit length, a first portion of the fifth data segment in the first memory location and a second portion of the fifth data segment in metadata associated with the first memory location where the first and second portions may constitute the fifth data segment in its entirety.

In yet a further aspect of the present invention, the computer implemented data processing method of further comprises reading the third data segment from the first memory location; and performing one or more data management operations on the third data segment producing the first data segment.

In yet another aspect of the present invention the computer implemented data processing method of may entail reading the first portion of the third data segment from the first memory location and the second portion of the third data segment from the metadata; concatenating the first and second portions to form the third data segment; and performing one or more data management operations on the third data segment producing the first data segment.

In yet a further aspect of the present invention, the computer implemented data processing method of may require that if the second bit length was less than the first bit length, reading a first number of bits equal to the fifth bit length from the first memory location and performing one or more data management operations on the first number of bits producing the fourth data segment, reading a second number of bits equal to the second bit length from the fourth data segment and performing the inverse of the transformation algorithm on the second number of bits producing the first data segment.

In yet another aspect of the present invention, the computer implemented data processing method of may comprise reading the first portion of the fifth data segment from the first memory location; reading the second portion of the fifth data segment from the metadata; concatenating the first and second portions to form the fifth data segment; performing data management operations on the fifth data segment producing the fourth data segment; if the second bit length was less than the first bit length, reading a number of bits equal to the second bit length from the fourth data segment and performing the inverse of the transformation algorithm on the number of bits producing the first data segment.

In yet additional aspects of the present invention, the computer implemented data processing method of the present invention may utilize a transformation algorithm comprising an encoding algorithm or a data compression algorithm, and/or data management operations comprising an encryption operation, a decryption operation, a comparison operation, an error correction operation, a compression operation, as well as one or more of the following cryptographic operations: symmetric-key encryption, symmetric-key decryption, asymmetric-key encryption, asymmetric-key decryption, hashing, keyed hashing, digital signature computation, or digital signature verification. The computer implemented data processing method of the present invention may also utilize data management operations comprising an encryption operation or decryption operation utilizing the Advanced Encryption Standard symmetric-key algorithm or the Data Encryption Standard symmetric-key algorithm.

In yet a further aspect of the present invention, the computer implemented data processing method may comprise inputting a first data segment of a first bit length into a compression algorithm to produce a second data segment of a second bit length; if the first bit length is equal to or less than the second bit length, inputting the first data segment into one or more cryptographic operations producing a third data segment of a third bit length and storing the third data segment in a first memory location associated with the first data segment; if the first bit length is greater than the second bit length, appending one or more padding bits to the second data segment to produce a fourth data segment having a fourth bit length greater than or equal to a minimum input size to the one or more cryptographic operations, inputting the fourth data segment into the one or more cryptographic operations producing a fifth data segment of a fifth bit length, if the fifth bit length is less than the first bit length, appending one or more padding bits to the fifth data segment to produce a sixth data segment having a sixth bit length equal to the first bit length and storing the sixth data segment in the first memory location.

In yet another aspect of the present invention, the computer implemented data processing method further comprises storing, when the third bit length is greater than the first bit length, a first portion of the third data segment in the first memory location and a second portion of the third data segment in metadata associated with the first memory location where the first and second portions may constitute the third data segment in its entirety.

In yet a further aspect of the present invention, the computer implemented data processing method further comprises storing, when the fifth bit length is greater than the first bit length, a first portion of the fifth data segment in the first memory location and a second portion of the fifth data segment in metadata associated with the first memory location where the first and second portions constitute the fifth data segment in its entirety.

In yet an additional further aspects of the present invention, the computer implemented data processing method further comprises reading the third data segment from the first memory location; and performing one or more security operations on the third data segment producing the first data segment.

In yet an additional aspect of the present invention, the computer implemented data processing method further comprises reading the first portion of the third data segment from the first memory location and the second portion of the third data segment from the metadata; concatenating the first and second portions to form the third data segment; and performing one or more security operations on the third data segment to produce the first data segment.

In yet a further aspect of the present invention, the computer implemented data processing method further comprises, if the second bit length was less than the first bit length, reading a first number of bits equal to the fifth bit length from the first memory location and performing one or more security operations on the first number of bits producing the fourth data segment, reading a second number of bits equal to the second bit length from the fourth data segment and performing the inverse of the compression algorithm on the second number of bits producing the first data segment.

In yet an additional aspect of the present invention, the computer implemented data processing method further comprises reading the first portion of the fifth data segment from the first memory location; reading the second portion of the fifth data segment from the metadata; concatenating the first and second portions to form the fifth data segment; performing one or more security operations on the fifth data segment producing the fourth data segment; if the second bit length was less than the first bit length, reading a number of bits equal to the second bit length from the fourth data segment and performing the inverse of the compression algorithm on the number of bits producing the first data segment.

In another aspect of the present invention, the computer implemented data processing method comprises inputting a first data segment of a first bit length into a transformation algorithm, which may comprise a compression algorithm or an encoding algorithm, to produce a second data segment of a second bit length; if the first bit length is equal to or less than the second bit length, performing one or more data management operations on the first data segment producing a third data segment of a third bit length and storing the third data segment in a first memory location associated with the first data segment; if the first bit length is greater than the second bit length, appending one or more padding bits to the second data segment to produce a fourth data segment having a fourth bit length greater than or equal to a minimum input size to the one or more data management operations, performing the one or more data management operations on the fourth data segment producing a fifth data segment of a fifth bit length, if the fifth bit length is less than the first bit length and greater than the fourth bit length, extracting the first n bits, where n equals the fourth bit length, from the fifth data segment and appending one or more padding bits to the first n bits to produce a sixth data segment having a sixth bit length equal to the first bit length and storing the sixth data segment in the first memory location.

In yet an additional further aspect of the present invention, the computer implemented data processing method further comprises storing the last y bits of the fifth data segment, where y equals the fifth bit length minus the fourth bit length, in metadata associated with the first memory location. Additionally, the computer implemented data processing method of the present invention may comprise reading the first n bits from the sixth data segment in the first memory location; reading the y bits from the metadata; concatenating the n bits and the y bits to form the fifth data segment; performing one or more data management operations on the fifth data segment producing the fourth data segment; if the second bit length was less than the first bit length, reading a number of bits equal to the second bit length from the fourth data segment and performing the inverse of the transformation algorithm on the number of bits producing the first data segment.

In yet an additional aspect of the present invention, the computer implemented method comprises transforming a data segment from a plurality of data segments forming an arrangement in a memory array to produce a transformed data segment; performing one or more data management operations on the transformed data segment to produce a modified data segment; writing the modified data segment to the memory array wherein the arrangement of the plurality of data segments is maintained in the memory array. The transforming is preferably performed using an encoding algorithm or a data compression algorithm and the computer implemented method of the present invention may utilize data management operations comprising an encryption operation, a decryption operation, a comparison operation, an error correction operation, a compression operation, as well as one or more of the following cryptographic operations: symmetric-key encryption, symmetric-key decryption, asymmetric-key encryption, asymmetric-key decryption, hashing, keyed hashing, digital signature computation, or digital signature verification. The computer implemented method of the present invention may also utilize data management operations comprising an encryption operation or decryption operation utilizing the Advanced Encryption Standard symmetric-key algorithm or the Data Encryption Standard symmetric-key algorithm.

In yet a further aspect of the present invention, the computer implemented method further comprises reading a portion of the modified data segment from the memory array; performing one or more data management operations on the portion of the modified data segment to produce the transformed data segment; and performing the inverse of the transforming step on the transformed data segment to produce the data segment.

In yet another aspect of the present invention, the computer implemented method comprises encoding a data segment from a plurality of data segments forming an arrangement in a memory array to produce an encoded data segment; encrypting the encoded data segment to produce an encrypted data segment; and writing the encrypted data segment to the memory array wherein the arrangement of the plurality of data segments is maintained in the memory array. The encoding may preferably be performed using a data compression algorithm and the encrypting may preferably be performed using an encryption operation selected from the group consisting of symmetric-key encryption, asymmetric-key encryption, the Advanced Encryption Standard symmetric-key encryption algorithm and/or a Data Encryption Standard symmetric-key encryption algorithm.

In yet a further aspect of the present invention, the computer implemented method further comprises reading a portion of the encrypted data segment from the memory array; decrypting the portion of the encrypted data segment to produce the encoded data segment; and decoding the encoded data segment to produce the data segment.

In yet an additional aspect of the present invention, the computer implemented method comprises compressing a first data segment, having a first bit length and a position within an arrangement of a plurality of data segments in a memory array, to produce a second data segment of a second bit length, an integer representing the second bit length and a value representing whether or not the first data segment was compressed; if the value indicates that the first data segment was not compressed, encrypting the first data segment using the Advanced Encryption Standard symmetric-key encryption algorithm to produce a third data segment of a third bit length and writing the third data segment to the first data segment's position in the memory array wherein the arrangement of the plurality of data segments is maintained; if the value indicates that the first data segment was compressed, concatenating the integer with the second data segment to produce a fourth data segment having a fourth bit length, appending one or more padding bits to the fourth data segment to produce a fifth data segment having a fifth bit length greater than or equal to a minimum input size to the encryption algorithm, encrypting the fifth data segment using the encryption algorithm to produce a sixth data segment of a sixth bit length, if the sixth bit length is less than the first bit length, appending one or more padding bits to the sixth data segment to produce a seventh data segment having a seventh bit length equal to the first bit length and writing the seventh data segment to the first data segment's position in the memory array wherein the arrangement of the plurality of data segments is maintained.

In yet another aspect of the present invention, the computer implemented method further comprises writing, when the third bit length is greater than the first bit length, a first portion of the third data segment to the first data segment's position in the memory array wherein the arrangement of the plurality of data segments is maintained and a second portion of the third data segment in metadata associated with the first data segment's position in the memory array where the first and second portions may constitute the third data segment in its entirety.

In yet an additional aspect of the present invention, the computer implemented method further comprises writing, when the sixth bit length is greater than the first bit length, a first portion of the sixth data segment to the first data segment's position in the memory array wherein the arrangement of the plurality of data segments is maintained and a second portion of the sixth data segment and the value in metadata associated with the first data segment's position in the memory array where the first and second portions may constitute the sixth data segment in its entirety.

In yet a further aspect of the present invention, the computer implemented method further comprises reading the third data segment from the memory array; and decrypting the third data segment using the encryption algorithm to produce the first data segment.

In yet another aspect of the present invention, the computer implemented method further comprises reading the first portion of the third data segment from the first data segment's position in the memory array and the second portion of the third data segment from the metadata; concatenating the first and second portions to form the third data segment; and decrypting the third data segment using the encryption algorithm to produce the first data segment.

In yet another aspect of the present invention, the computer implemented method further comprises storing the value in metadata associated with the first data segment's position in the memory array; reading the value from the metadata; and if the value indicates that the first data segment was compressed, reading a first number of bits equal to the sixth bit length from the first data segment's position in the memory array, decrypting the first number of bits to produce the fifth data segment, reading a second number of bits equal to the fourth bit length from the fifth data segment, separating the integer and the second data segment from the second number of bits and inputting the second data segment, the integer and the value into a decompression algorithm that is the inverse of a compression algorithm used to compress the first data segment to produce the first data segment.

In yet an additional aspect of the present invention, the computer implemented method further comprises reading the value from the metadata; and if the value indicates that the first data segment was compressed, decrypting a minimum number of bits necessary from the first data segment's position in the memory array to determine the integer, computing the fifth bit length using the integer and the minimum input size, inputting a first number of bits equal to the fifth bit length from the first data segment's position in the memory array to a decryption algorithm to produce the fifth data segment, computing the fourth bit length using the integer and the minimum input size, using the computed fourth bit length to extract the fourth data segment from the fifth data segment, extracting the last integer bits from the fourth data segment to obtain the second data segment, and inputting the second data segment, the integer and the value into a decompression algorithm that is the inverse of a compression algorithm used to compress the first data segment to produce the first data segment.

In yet another aspect of the present invention, the computer implemented method further comprises reading the first portion of the sixth data segment from the first data segment's position in the memory array; reading the second portion of the sixth data segment and the value from the metadata; concatenating the first and second portions to form the sixth data segment; decrypting the sixth data segment to obtain the fifth data segment and the integer, computing the fourth bit length using the integer and the minimum input size, using the computed fourth bit length to extract the fourth data segment from the fifth data segment, extracting the last integer bits from the fourth data segment to obtain the second data segment, and inputting the second data segment, the integer and the value into a decompression algorithm that is the inverse of a compression algorithm used to compress the first data segment to produce the first data segment.

In yet a further aspect of the present invention, the computer implemented method may further comprise, if the value indicates that the first data segment was compressed, concatenating the integer with the second data segment to produce a fourth data segment having a fourth bit length, appending one or more padding bits to the fourth data segment to produce a fifth data segment having a fifth bit length greater than or equal to a minimum input size to the encryption algorithm, encrypting the fifth data segment using the encryption algorithm to produce a sixth data segment of a sixth bit length, if the sixth bit length is less than the first bit length and greater than the fifth bit length, extracting the first n bits, where n equals the fifth bit length, from the sixth data segment and appending one or more padding bits to the first n bits to produce a seventh data segment having a seventh bit length equal to the first bit length and writing the seventh data segment to the first data segment's position in the memory array wherein the arrangement of the plurality of data segments is maintained. Additionally, the computer implemented data processing method may comprise storing the last y bits of the sixth data segment, where y equals the sixth bit length minus the fifth bit length, in metadata associated with the first data segment's position in the memory array.

In yet a further aspect of the present invention, the computer implemented method may further comprise reading the first n bits from the seventh data segment in the memory array; reading they bits from the metadata; concatenating the n bits and they bits to form the sixth data segment; decrypting the sixth data segment to obtain the fifth data segment and the integer, computing the fourth bit length using the integer and the minimum input size, using the computed fourth bit length to extract the fourth data segment from the fifth data segment, extracting the last integer bits from the fourth data segment to obtain the second data segment, and inputting the second data segment, the integer and the value into a decompression algorithm that is the inverse of a compression algorithm used to compress the first data segment to produce the first data segment.

In another aspect of the present invention, the computer implemented method comprises compressing a first data segment, having a first bit length and a position within an arrangement of a plurality of data segments in a memory array, to produce a second data segment of a second bit length, an integer representing the second bit length and a value representing whether or not the first data segment was compressed; if the value indicates that the first data segment was not compressed, performing operations on the first data segment wherein the operations include a hash function to produce a third data segment of a third bit length and writing the third data segment to the first data segment's position in the memory array wherein the arrangement of the plurality of data segments is maintained; if the value indicates that the first data segment was compressed, concatenating the integer with the second data segment to produce a fourth data segment having a fourth bit length, appending one or more padding bits to the fourth data segment to produce a fifth data segment having a fifth bit length greater than or equal to a minimum input size to the hash function, performing operations on the fifth data segment using the hash function to produce a sixth data segment of a sixth bit length, if the sixth bit length is less than the first bit length, appending one or more padding bits to the sixth data segment to produce a seventh data segment having a seventh bit length equal to the first bit length and writing the seventh data segment to the first data segment's position in the memory array wherein the arrangement of the plurality of data segments is maintained.

In yet a further aspect of the present invention, the computer implemented method may further comprise writing, when the third bit length is greater than the first bit length, a first portion of the third data segment to the first data segment's position in the memory array wherein the arrangement of the plurality of data segments is maintained and a second portion of the third data segment in metadata associated with the first data segment's position in the memory array where the first and second portions may constitute the third data segment in its entirety.

In yet another aspect of the present invention, the computer implemented method further comprises writing, when the sixth bit length is greater than the first bit length, a first portion of the sixth data segment to the first data segment's position in the memory array wherein the arrangement of the plurality of data segments is maintained and a second portion of the sixth data segment and the value in metadata associated with the first data segment's position in the memory array where the first and second portions may constitute the sixth data segment in its entirety.

In yet a further aspect of the present invention, the computer implemented method further comprises reading the third data segment from the memory array; and performing operations on the third data segment wherein the operations include a hash function to obtain the first data segment.

In yet an additional aspect of the present invention, the computer implemented method further comprises reading the first portion of the third data segment from the first data segment's position in the memory array and the second portion of the third data segment from the metadata; concatenating the first and second portions to form the third data segment; and performing operations on the third data segment wherein the operations include a hash function to produce the first data segment.

In yet a further aspect of the present invention, the computer implemented method further comprises storing the value in metadata associated with the first data segment's position in the memory array, reading the value from the metadata; and if the value indicates that the first data segment was compressed, reading a number of bits equal to the sixth bit length from the first data segment's position in the memory array, performing operations on the sixth number of bits wherein the operations include a hash function to obtain the fifth data segment, reading a second number of bits equal to the fourth bit length from the fifth data segment, separating the integer and the second data segment from the second number of bits and inputting the second data segment, the integer and the value into a decompression algorithm that is the inverse of a compression algorithm used to compress the first data segment to produce the first data segment.

In yet another aspect of the present invention, the computer implemented method further comprises reading the first portion of the sixth data segment from the first data segment's position in the memory array; reading the second portion of the sixth data segment and the value from the metadata; concatenating the first and second portions to form the sixth data segment; performing operations on the sixth data segment wherein the operations include a hash function to obtain the fifth data segment and the integer, computing the fourth bit length using the integer and the minimum input size, using the computed fourth bit length to extract the fourth data segment from the fifth data segment, extracting the last integer bits from the fourth data segment to obtain the second data segment, and inputting the second data segment, the integer and the value into a decompression algorithm that is the inverse of a compression algorithm used to compress the first data segment to produce the first data segment.

In yet a further aspect of the present invention, the computer implemented method further comprises, if the value indicates that the first data segment was compressed, concatenating the integer with the second data segment to produce a fourth data segment having a fourth bit length, appending one or more padding bits to the fourth data segment to produce a fifth data segment having a fifth bit length greater than or equal to a minimum input size to the hash function, performing operations on the fifth data segment wherein the operations include a hash function to produce a sixth data segment of a sixth bit length, if the sixth bit length is less than the first bit length and greater than the fifth bit length, extracting the first n bits, where n equals the fifth bit length, from the sixth data segment and appending one or more padding bits to the first n bits to produce a seventh data segment having a seventh bit length equal to the first bit length and writing the seventh data segment to the first data segment's position in the memory array wherein the arrangement of the plurality of data segments is maintained.

In yet another aspect of the present invention, the computer implemented method further comprises storing the last y bits of the sixth data segment, where y equals the sixth bit length minus the fifth bit length, in metadata associated with the first data segment's position in the memory array.

In yet a further aspect of the present invention, the computer implemented method further comprises reading the first n bits from the seventh data segment in the memory array; reading the y bits from the metadata; concatenating the n bits and they bits to form the sixth data segment; performing operations on the sixth data segment wherein the operations include a hash function to obtain the fifth data segment and the integer, computing the fourth bit length using the integer and the minimum input size, using the computed fourth bit length to extract the fourth data segment from the fifth data segment, extracting the last integer bits from the fourth data segment to obtain the second data segment, and inputting the second data segment, the integer and the value into a decompression algorithm that is the inverse of a compression algorithm used to compress the first data segment to produce the first data segment.

BRIEF DESCRIPTION OF THE DRAWINGS

The above and other objects and advantages of the present invention will become apparent from the following description when read in conjunction with the accompanying drawings wherein.

DETAILED DESCRIPTION OF THE PREFERRED EMBODIMENTS

Figure 1:
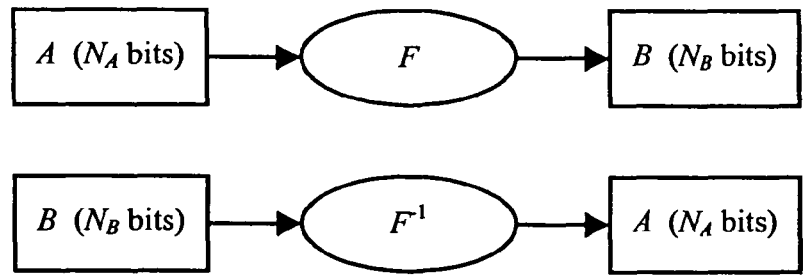
FIG. 1 is a simplified prior art description of data compression and decompression.
Figure 2:
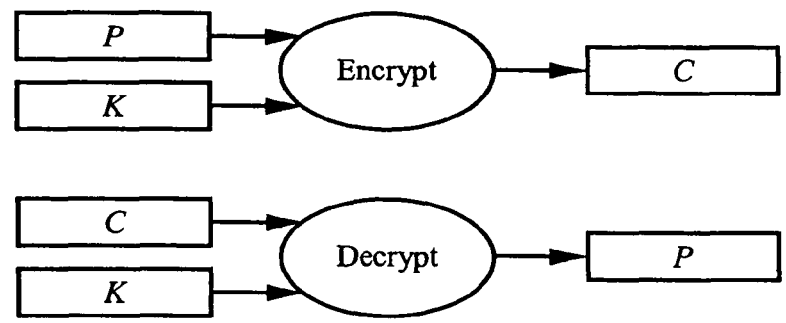
FIG. 2 is a simplified prior art description of data encryption and decryption.
Figure 3:
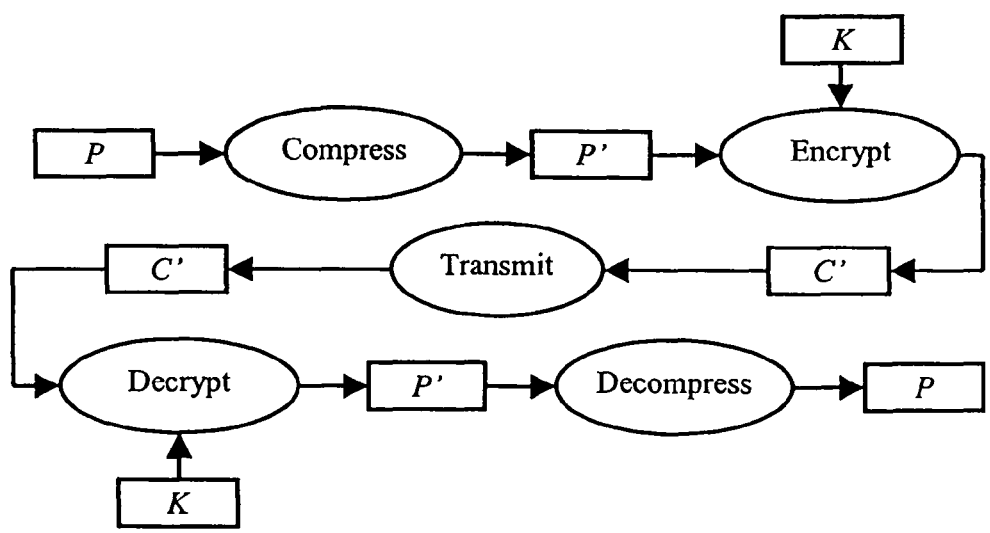
FIG. 3 is a simplified prior art description of a secure network transaction that involves data compression.

A preferred embodiment of the present invention generally relates to a computing system having a processor and memory system (which can be external cache memory, external RAM, and/or memory partially internal to the processor) for executing instructions that can be externally provided in software as a computer program product and stored in a data storage unit utilized by the present invention.

The computer system utilized by a preferred embodiment of the present invention may include one or more I/O (input/output) devices, including a display device such as a monitor. The I/O devices may also include an input device such as a keyboard, and a cursor control such as a mouse, trackball, or trackpad. In addition, the I/O devices may also include a network connector such that the computer system is part of a local area network (LAN) or a wide area network (WAN), the I/O devices, a device for sound recording, and/or playback, such as an audio digitizer coupled to a microphone for recording voice input for speech recognition. The I/O devices may also include a video digitizing device that can be used to capture video images, a hard copy device such as a printer, and a CD-ROM device.

A computer program product readable by a data storage unit according to a preferred embodiment of the present invention may include a machine or computer-readable medium having stored thereon instructions which may be used to program (i.e. define operation of) a computer (or other electronic devices) to perform a process according to the present invention. The computer-readable medium of a data storage unit may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

The computing system according to a preferred embodiment of the present invention can be a general-purpose computer having a processor with a suitable register structure, or can be configured for special purpose or embedded applications. In an embodiment, the methods of the present invention are embodied in machine-executable instructions directed to control operation of the computing system, and more specifically, operation of the processor and registers. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A preferred embodiment of the present invention involves a secure data storage system in which an element of data storage to be protected is a file. The logical representation of a file consists of an arbitrary number m of fixed-length segments $Y1_j$, where j is an integer between 1 and m, and each segment is of size n bits. In the secure storage system, it is desirable to protect each segment using cryptographic security operations such as encryption algorithms for confidentiality and keyed hash functions for data integrity. Furthermore, it may also be desirable to intermittently perform data management operations on files. Such operations may include the comparison of different segments from different files to identify and reduce the number of redundant stored segments in the file system. In a preferred embodiment of the present invention, there are two processes: the first process involves securely writing a single segment of data to storage, and the second process involves securely reading a single segment of data from storage.

Figure 4:
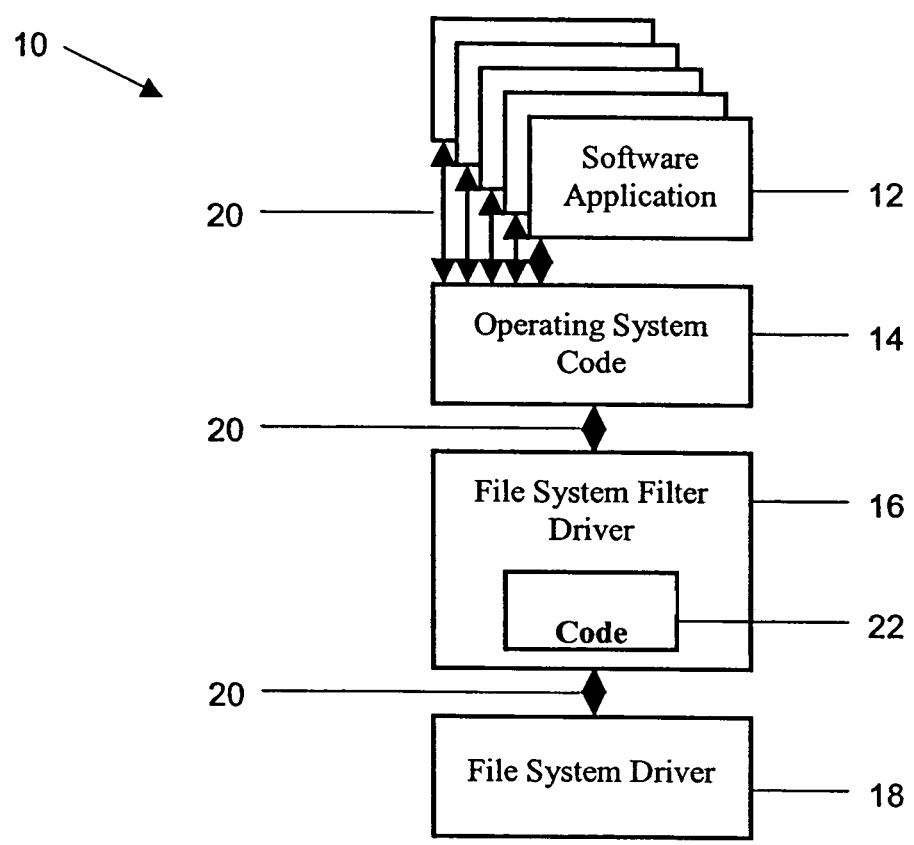
FIG. 4 illustrates the logical location of the software implementation of a preferred embodiment of the present invention in a general-purpose computing system.

These two processes could be implemented in hardware and software, but in a preferred embodiment, the processes are implemented in system-level software that interfaces with the operating system. The location of the software that implements the invention in a general-purpose computing system 10 for a preferred embodiment is illustrated in FIG. 4. The boxes 12, 14, 16 and 18 represent code modules, and the arrows 20 represent file input/output (I/O) operations. The location of a software module 22 that implements a preferred embodiment of the present invention is preferably contained within a Microsoft Windows file system filter driver 16 (or the equivalent of such a filter driver in other operating systems) that intercepts all file system I/O to perform operations such as encryption and compression prior to sending file data to the underlying file system or subsequent to reading data from the underlying file system. Furthermore, in many systems, software module 22 does not require changes to the software applications or to the operating system kernel.

Figure 5:
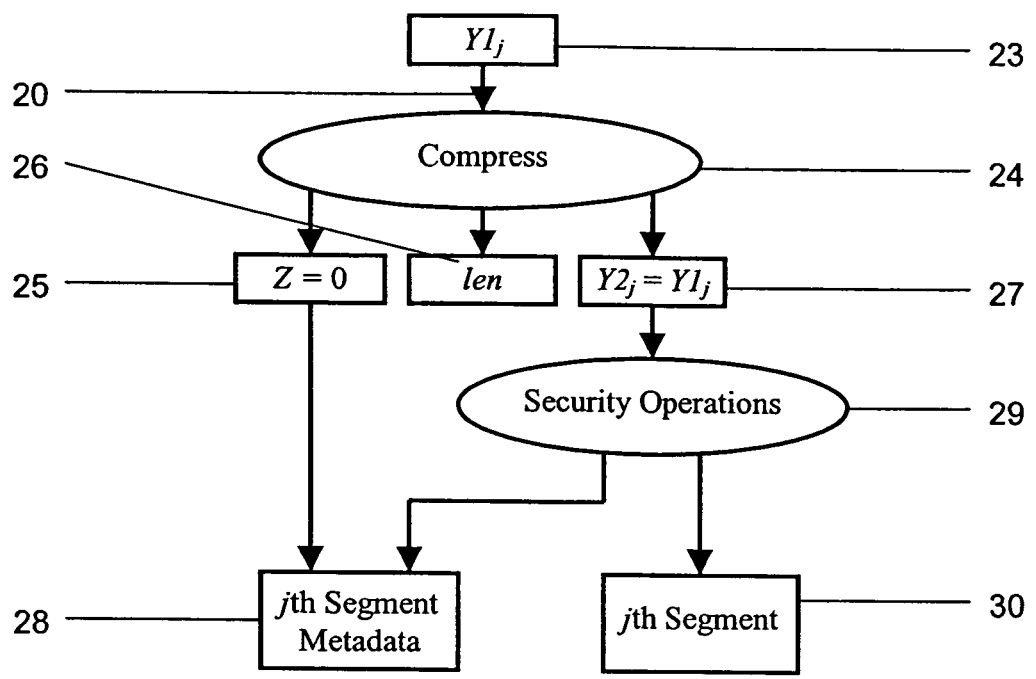
FIG. 5 illustrates the process of writing an uncompressible data segment to a file in a preferred embodiment of the present invention.

As shown in FIG. 5 the first process, which involves securely storing a newly created or recently modified data segment 23, proceeds as follows. Prior to performing any security operations, the segment $Y1_j$ 23 is inputted to a lossless data compression algorithm 24, such as an algorithm based upon LZ1 compression. The compression algorithm outputs (i) a new segment $Y2_j$ 27, (ii) an integer len 26 that specifies the bit length of $Y2_j$ 27, and (iii) a single bit Z 25 that specifies the result of the compression. An output of Z=0 indicates that the compression was not successful; an output of Z=1 indicates that the compression was successful. Furthermore, by definition in a preferred embodiment of the present invention, if Z=0, then $Y2_j$ equals $Y1_j$, and the value of len is the length of $Y1_j$; if Z=1, then $Y2_j$ represents $Y1_j$ in compressed form, and the value of len is at most the size of $Y1_j$ minus the size of the encoding of len. The next steps depend on the value of Z.

The process of storing a data segment when Z=0 is also illustrated in FIG. 5. Since Z=0, compression was unsuccessful, which means $Y2_j$ equals $Y1_j$. The value of Z will be stored in metadata 28 that is associated with the jth segment. In a preferred embodiment, such metadata 28 can be stored in a separate associated file. Next, $Y2_j$ (which equals $Y1_j$) will be inputted to the security operations 29 (e.g., encryption). The output of the security operations 29, which has a bit length that is greater than or equal to that of $Y2_j$, is then stored to the file system as follows. If the bit length of the security operation output equals that of $Y2_j$, then the output is simply stored to the jth segment of the file 30. If the bit length of the security operation output exceeds that of $Y2_j$, then the security operation output will be stored in part to the jth segment of the file 30 and stored in part to metadata 28 associated with the jth file segment.

Figure 6:
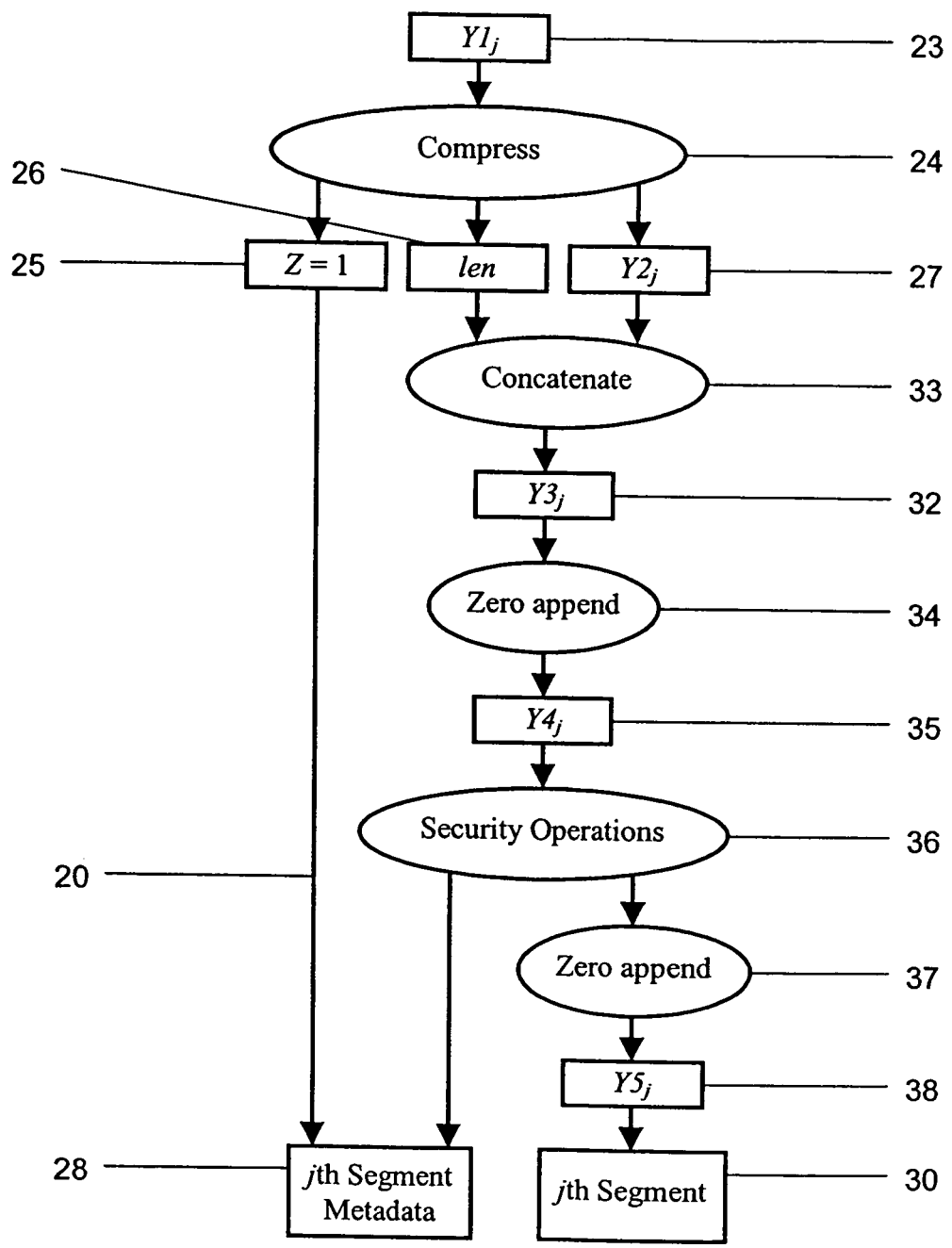
FIG. 6 illustrates the process of writing a compressible data segment to a file in a preferred embodiment of the present invention.

The process of storing a data segment when Z=1 is illustrated in is illustrated in FIG. 6. Since Z=1, the compression algorithm successfully compressed $Y1_j$. The value of Z will be stored in metadata 28 that is associated with the jth segment. Next, the value of len 26 will be encoded and concatenated 33 to the segment $Y2_j$ 27 to produce a new segment $Y3_j$ 32. Next, the minimal number of zeroes (i.e., 0, 1, 2, or greater zero bits) are appended at 34 to $Y3_j$ 32 to produce a new segment $Y4_j$ 35 such that the length of $Y4_j$ 35 is a multiple of the least common multiple of the minimum input block sizes for all of the relevant security operations. The value of $Y4_j$ 35 is then inputted to the security operations 36. The output of the security operations, which has a bit length that is greater than or equal to that of $Y4_j$ 35, is then stored to the file system as follows. Let x be the bit length of $Y4_j$ 35. The first x bits of the output of the security operations are appended at 37 with (n-x) zero bits to produce a data segment $Y5_j$ 38 such that the bit length of $Y5_j$ 38 is equal to n, which is the bit length of $Y1_j$ 23. $Y5_j$ 38 is then stored to the jth segment of the file 30. If the bit length of the security operation output is greater than x, then the bits of the security operation output that are not represented in $Y5_j$ 38 are stored to metadata 28 that is associated with the jth segment of the file 30.

Figure 7:
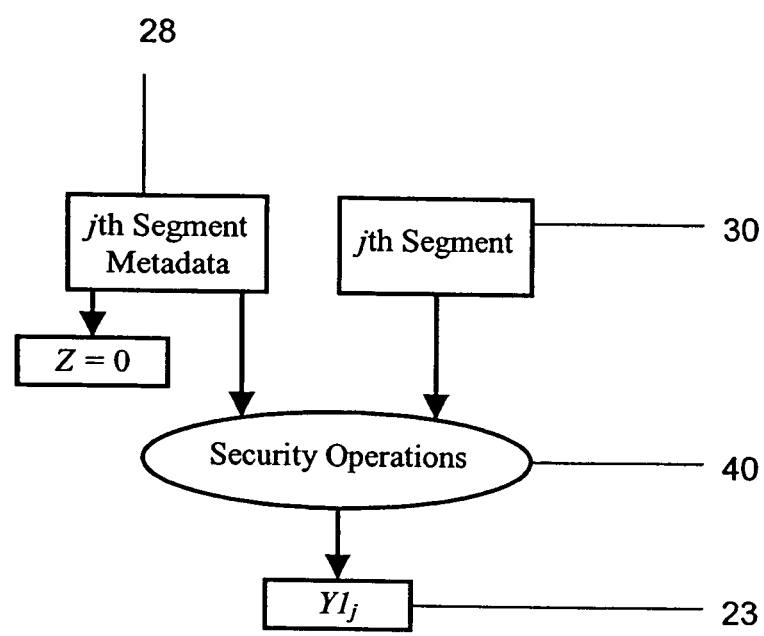
FIG. 7 illustrates the process of reading a data segment from a file in which data decompression is not required in a preferred embodiment of the present invention.

A second preferred process according to the present invention, which involves securely retrieving the data segment $Y1_j$ 23 from a stored file, proceeds as follows. In the description that follows, the structures and contexts of x, len, $Y1_j$, $Y2_j$, $Y3_j$, $Y4_j$, and $Y5_j$ are the same as those recited above. First, the bit Z (read from the metadata associated with the jth file data segment 30) is inspected. FIG. 7 illustrates the process of retrieving a data segment from a file when Z=0, and FIG. 8 illustrates this process when Z=1.

If Z=0, then the segment of data was not modified by the compression algorithm. As shown in FIG. 7, the n-bit jth data segment is read from the file 30, and this n-bit data segment is inputted to the security operations 40. Depending on the nature of the security operations, metadata from 28 that is associated with the jth file segment 30 may also be inputted to the security operations. The output of the security operations is the desired data segment $Y1_j$ 23.

Figure 8:
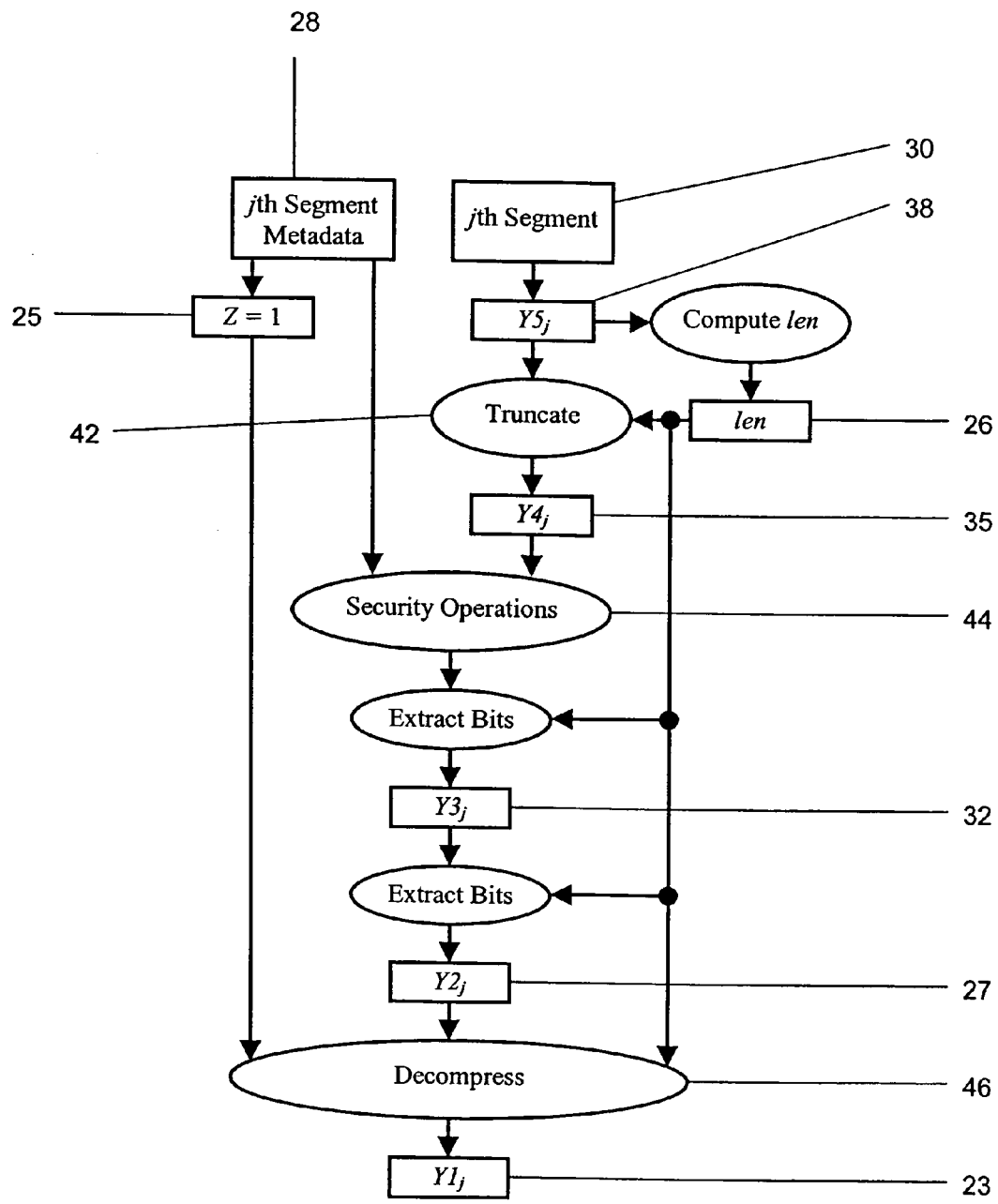
FIG. 8 illustrates the process of reading a data segment from a file in which data decompression is required in a preferred embodiment of the present invention.

If Z=1, then decompression will be required, as illustrated in FIG. 8. Let the segment of data retrieved directly from the stored file be $Y5_j$ 38. If the data segment 38 is obscured by encryption or similar security operations, then a minimum required number of bits in $Y5_j$ 38 are decrypted such that the value of len 26 can be known. Given len 26 and the least common multiple of the minimum input block sizes of the relevant security operations 44, the value of x can be computed. Next, the first x bits of $Y5_j$ 38 are inputted to the security operations 44. Depending on the nature of the security operations 44, metadata 28 that is associated with the jth file segment 30 may also be inputted to the security operations 44. The output of the security operations 44 is the segment $Y4_j$ 35, which consists of the segment $Y3_j$ 32 and possibly a string of zero bits. With the value of len 26 and the least common multiple of the minimum input block sizes of the relevant security operations, the length of $Y3_j$ 32 can be computed. After computing this length, $Y3_j$ 32 is extracted from the beginning of $Y4_j$ 35. $Y3_j$ 32 consists of the encoding of len 26 and the data segment $Y2_j$ 27, where len 26 is the length of $Y2_j$ 27. The last len bits of $Y3_j$ 32 are extracted from $Y3_j$ 32 to obtain $Y2_j$ 27. The value of Z, len, and $Y2_j$ 27 are then inputted to a lossless decompression algorithm 46 that is the inverse function of the lossless data compression algorithm 24. The output of this decompression algorithm 46 is the desired n-bit data segment $Y1_j$ 23.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

We claim:

1. A method for use with a secure data storage system, the method comprising:
    transforming, with a processor, a first data segment of a first bit length into a second data segment of a second bit length;
    if the first bit length is equal to or less than the second bit length,
        performing, with a processor, one or more data management operations on the first data segment to produce a third data segment of a third bit length; and
        storing the third data segment in a first memory location associated with the first data segment;
    if the first bit length is greater than the second bit length,
        appending, with a processor, a number of padding bits to the second data segment to produce a fourth data segment having a fourth bit length greater than or equal to a minimum input size to the one or more data management operations; and
        performing, with a processor, the one or more data management operations on the fourth data segment producing a fifth data segment of a fifth bit length; and
    if the fifth bit length is less than the first bit length and greater than or equal to the fourth bit length,
        appending, with a processor, a number of padding bits to the fifth data segment to produce a sixth data segment having a sixth bit length equal to the first bit length; and
    storing the sixth data segment in the first memory location, wherein the storing is performed by the processor and comprises writing information to non-volatile data storage in the secure data storage system.

2. The method of claim 1 further comprising:
    storing, when the third bit length is greater than the first bit length, a first portion of the third data segment in the first memory location and a second portion of the third data segment in metadata associated with the first memory location.

3. The method of claim 2 wherein the first and second portions of the third data segment constitute the third data segment in its entirety.

4. The method of claim 1 further comprising:
    storing, when the fifth bit length is greater than the first bit length, a first portion of the fifth data segment in the first memory location and a second portion of the fifth data segment in metadata associated with the first memory location.

5. The method of claim 4 wherein the first and second portions of the third data segment constitute the fifth data segment in its entirety.

6. The method of claim 1 further comprising:
    reading the third data segment from the first memory location; and
    performing second one or more data management operations on the third data segment to produce the first data segment.

7. The method of claim 2 further comprising:
    reading the first portion of the third data segment from the first memory location and the second portion of the third data segment from the metadata;
    concatenating the first and second portions to form the third data segment; and
    performing second one or more data management operations on the third data segment to produce the first data segment.

8. The method of claim 1 further comprising:
    if the second bit length is less than the first bit length,
        reading a first number of bits equal to the fifth bit length from the first memory location and performing second one or more data management operations on the first number of bits to produce the fourth data segment,
        reading a second number of bits equal to the second bit length from the fourth data segment and performing an inverse transformation on the second number of bits to produce the first data segment.

9. The method of claim 4 further comprising:
    reading the first portion of the fifth data segment from the first memory location;
    reading the second portion of the fifth data segment from the metadata;
    concatenating the first and second portions to form the fifth data segment;
    performing second data management operations on the fifth data segment to produce the fourth data segment; and
    if the second bit length is less than the first bit length, reading a number of bits equal to the second bit length from the fourth data segment and performing an inverse transformation on the number of bits producing the first data segment.

10. The method of claim 1 wherein transforming the first data segment comprises executing an encoding algorithm.

11. The method of claim 1 wherein transforming the first data segment comprises executing a data compression algorithm.

12. The method of claim 1 wherein the one or more data management operations comprise an encryption operation.

13. The method of claim 1 wherein the one or more data management operations comprise one or more of the following operations:
- a comparison operation,
- an error correction operation, and
- a compression operation.

14. The method of claim 1 wherein the one or more data management operations comprise one or more of the following cryptographic operations:
- a symmetric-key encryption operation,
- a symmetric-key decryption operation,
- an asymmetric-key encryption operation,
- an asymmetric-key decryption operation,
- a hashing operation,
- a keyed hashing operation,
- a digital signature computation, and
- a digital signature verification.

15. The method of claim 1 wherein the one or more data management operations comprise at least one of the following:
- an encryption operation utilizing Advanced Encryption Standard symmetric-key algorithm; and
- a decryption operation utilizing Advanced Encryption Standard symmetric-key algorithm.

16. The method of claim 1 wherein the one or more data management operations comprise at least one of the following:
- an encryption operation utilizing Data Encryption Standard symmetric-key algorithm; and
- a decryption operation utilizing Data Encryption Standard symmetric-key algorithm.

17. A method for use with a secure data storage system, the method comprising:
inputting a first data segment of a first bit length into a compression algorithm to produce a second data segment of a second bit length, wherein the inputting is performed by a computer;
if the first bit length is equal to or less than the second bit length,
    inputting the first data segment into one or more cryptographic operations to produce a third data segment of a third bit length, wherein the inputting is performed by the computer; and
    storing the third data segment in a first memory location associated with the first data segment;
if the first bit length is greater than the second bit length,
    appending a number of padding bits to the second data segment to produce a fourth data segment having a fourth bit length greater than or equal to a threshold input size to the one or more cryptographic operations, wherein the appending is performed by the computer;
    inputting the fourth data segment into the one or more cryptographic operations to produce a fifth data segment of a fifth bit length, wherein the inputting is performed by the computer; and
    if the fifth bit length is less than the first bit length and greater than or equal to the fourth bit length,
        appending a number of padding bits to the fifth data segment to produce a sixth data segment having a sixth bit length equal to the first bit length, wherein the appending is performed by the computer; and
    storing the sixth data segment in the first memory location, wherein the storing is performed by the computer and comprises writing information to non-volatile data storage in the secure data storage system.

18. The method of claim 17 further comprising:
storing, when the third bit length is greater than the first bit length, a first portion of the third data segment in the first memory location and a second portion of the third data segment in metadata associated with the first memory location.

19. The method of claim 18 wherein the first and second portions constitute the third data segment in its entirety.

20. The method of claim 17 further comprising:
storing, when the fifth bit length is greater than the first bit length, a first portion of the fifth data segment in the first memory location and a second portion of the fifth data segment in metadata associated with the first memory location.

21. The method of claim 20 wherein the first and second portions constitute the fifth data segment in its entirety.

22. The method of claim 17 further comprising:
reading the third data segment from the first memory location; and
performing one or more security operations on the third data segment to produce the first data segment.

23. The method of claim 18 further comprising:
reading the first portion of the third data segment from the first memory location and the second portion of the third data segment from the metadata;
concatenating the first and second portions to form the third data segment; and to perform one or more security operations on the third data segment to produce the first data segment.

24. The method of claim 17 further comprising:
if the second bit length is less than the first bit length,
    reading a first number of bits equal to the fifth bit length from the first memory location and
    performing one or more security operations on the first number of bits to produce the fourth data segment,
    reading a second number of bits equal to the second bit length from the fourth data segment and
    performing the inverse of the compression algorithm on the second number of bits to produce the first data segment.

25. The method of claim 20 further comprising:
reading the first portion of the fifth data segment from the first memory location;
reading the second portion of the fifth data segment from the metadata;
concatenating the first and second portions to form the fifth data segment;
performing one or more security operations on the fifth data segment to produce the fourth data segment; and
if the second bit length is less than the first bit length,
    reading a number of bits equal to the second bit length from the fourth data segment and
    performing the inverse of the compression algorithm on the number of bits to produce the first data segment.

26. A method comprising:
inputting a first data segment of a first bit length into a transformation algorithm to produce a second data segment of a second bit length;
if the first bit length is equal to or less than the second bit length,
performing, using a processor, one or more data management operations on the first data segment to produce a third data segment of a third bit length and storing the third data segment in a first memory location associated with the first data segment; and
if the first bit length is greater than the second bit length,
appending a number of padding bits to the second data segment to produce a fourth data segment having a fourth bit length greater than or equal to a minimum input size to the one or more data management operations, and
performing the one or more data management operations on the fourth data segment to produce a fifth data segment of a fifth bit length,
if the fifth bit length is less than the first bit length and greater than or equal to the fourth bit length,
extracting n bits, where n equals the fourth bit length, from the fifth data segment and appending a number of padding bits to the n bits to produce a sixth data segment having a sixth bit length equal to the first bit length and storing the sixth data segment in the first memory location.

27. The method of claim 26 further comprising:
storing the last y bits of the fifth data segment, where y equals the fifth bit length minus the fourth bit length, in metadata associated with the first memory location.

28. The method of claim 27 further comprising:
reading the n bits from the sixth data segment in the first memory location;
reading the y bits from the metadata;
concatenating the n bits and the y bits to form the fifth data segment;
performing one or more data management operations on the fifth data segment to produce the fourth data segment; and
if the second bit length was less than the first bit length,
reading a number of bits equal to the second bit length from the fourth data segment and
performing the inverse of the transformation algorithm on the number of bits to produce the first data segment.

29. The method of claim 26 wherein the transformation algorithm comprises at least one of the following:
a compression algorithm; and
an encoding algorithm.

30. A method comprising:
compressing a first data segment, having a first bit length and a position within an arrangement of a plurality of data segments in a memory array, to produce:
a second data segment of a second bit length,
an integer representing the second bit length, and
a value representing whether or not the first data segment was compressed;
if the value indicates that the first data segment was not compressed,
encrypting the first data segment using an encryption algorithm to produce a third data segment of a third bit length, and
writing the third data segment to the first data segment's position in the memory array wherein the arrangement of the plurality of data segments is maintained;
if the value indicates that the first data segment was compressed,
concatenating the integer with the second data segment to produce a fourth data segment having a fourth bit length,
appending a number of padding bits to the fourth data segment to produce a fifth data segment having a fifth bit length greater than or equal to a minimum input size to the encryption algorithm, and
encrypting the fifth data segment using the encryption algorithm to produce a sixth data segment of a sixth bit length;
if the sixth bit length is less than the first bit length and less than or equal to the fifth bit length,
appending a number of padding bits to the sixth data segment to produce a seventh data segment having a seventh bit length equal to the first bit length, and
writing the seventh data segment to the first data segment's position in the memory array wherein the arrangement of the plurality of data segments is maintained; and
if the sixth bit length is less than the first bit length and greater than or equal to the fifth bit length,
extracting, using a processor, n bits, where n equals the fifth bit length, from the sixth data
appending a number of padding bits to the n bits to produce an eighth data segment having an eighth bit length equal to the first bit length, and
writing the eighth data segment to the first data segment's position in the memory array wherein the arrangement of the plurality of data segments is maintained.

31. The method of claim 30 further comprising:
writing, when the third bit length is greater than the first bit length, a first portion of the third data segment to the first data segment's position in the memory array wherein the arrangement of the plurality of data segments is maintained and writing a second portion of the third data segment in metadata associated with the first data segment's position in the memory array.

32. The method of claim 31 wherein the first and second portions constitute the third data segment in its entirety.

33. The method of claim 30 further comprising:
writing, when the sixth bit length is greater than the first bit length, a first portion of the sixth data segment to the first data segment's position in the memory array wherein the arrangement of the plurality of data segments is maintained and writing a second portion of the sixth data segment and the value in metadata associated with the first data segment's position in the memory array.

34. The method of claim 33 wherein the first and second portions constitute the sixth data segment in its entirety.

35. The method of claim 30 further comprising:
reading the third data segment from the memory array; and
decrypting the third data segment using the encryption algorithm to produce the first data segment.

36. The method of claim 31 further comprising:
reading the first portion of the third data segment from the first data segment's position in the memory array and the second portion of the third data segment from the metadata;
concatenating the first and second portions to form the third data segment; and
decrypting the third data segment using the encryption algorithm to produce the first data segment.

37. The method of claim 30 further comprising:
storing the value in metadata associated with the first data segment's position in the memory array.

38. The method of claim 37 further comprising:
reading the value from the metadata; and
if the value indicates that the first data segment was compressed,
reading a first number of bits equal to the sixth bit length from the first data segment's position in the memory array,
decrypting the first number of bits to produce the fifth data segment,
reading a second number of bits equal to the fourth bit length from the fifth data segment,
separating the integer and the second data segment from the second number of bits and
inputting the second data segment, the integer and the value into a decompression algorithm that is the inverse of a compression algorithm used to compress the first data segment to produce the first data segment.

39. The method of claim 37 further comprising:
reading the value from the metadata; and
if the value indicates that the first data segment was compressed,
decrypting a minimum number of bits necessary from the first data segment's position in the memory array to determine the integer,
computing the fifth bit length using the integer and the minimum input size,
inputting a first number of bits equal to the fifth bit length from the first data segment's position in the memory array to a decryption algorithm to produce the fifth data segment,
computing the fourth bit length using the integer and the minimum input size, using the computed fourth bit length to extract the fourth data segment from the fifth data segment,
extracting the last integer bits from the fourth data segment to obtain the second data segment, and
inputting the second data segment, the integer and the value into a decompression algorithm that is the inverse of a compression algorithm used to compress the first data segment to produce the first data segment.

40. The method of claim 33 further comprising:
reading the first portion of the sixth data segment from the first data segment's position in the memory array;
reading the second portion of the sixth data segment and the value from the metadata;
concatenating the first and second portions to form the sixth data segment; and
decrypting the sixth data segment to obtain the fifth data segment and the integer,
computing the fourth bit length using the integer and the minimum input size,
using the computed fourth bit length to extract the fourth data segment from the fifth data segment,
extracting the last integer bits from the fourth data segment to obtain the second data segment, and
inputting the second data segment, the integer and the value into a decompression algorithm that is the inverse of a compression algorithm used to compress the first data segment to produce the first data segment.

41. The method of claim 30 further comprising:
storing the last y bits of the sixth data segment, where y equals the sixth bit length minus the fifth bit length, in metadata associated with the first data segment's position in the memory array.

42. The method of claim 41 further comprising:
reading the first n bits from the eighth data segment in the memory array;
reading the y bits from the metadata;
concatenating the n bits and the y bits to form the sixth data segment;
decrypting the sixth data segment to obtain the fifth data segment and the integer,
computing the fourth bit length using the integer and the minimum input size, using the computed fourth bit length to extract the fourth data segment from the fifth data segment,
extracting the last integer bits from the fourth data segment to obtain the second data segment, and
inputting the second data segment, the integer and the value into a decompression algorithm that is the inverse of a compression algorithm used to compress the first data segment to produce the first data segment.

43. A method comprising:
compressing a first data segment, having a first bit length and a position within an arrangement of a plurality of data segments in a memory array, to produce:
a second data segment of a second bit length,
an integer representing the second bit length, and
a value representing whether or not the first data segment was compressed;
if the value indicates that the first data segment was not compressed,
performing a hash function on the first data segment to produce a third data segment of a third bit length, and
writing the third data segment to the first data segment's position in the memory array wherein the arrangement of the plurality of data segments is maintained;
if the value indicates that the first data segment was compressed,
concatenating the integer with the second data segment to produce a fourth data segment having a fourth bit length,
appending a number of padding bits to the fourth data segment to produce a fifth data segment having a fifth bit length greater than or equal to a minimum input size to the hash function, and
performing an operation on the fifth data segment using the hash function algorithm to produce a sixth data segment of a sixth bit length;
if the sixth bit length is less than the first bit length and less than or equal to the fifth bit length,
appending a number of padding bits to the sixth data segment to produce a seventh data segment having a seventh bit length equal to the first bit length, and
writing the seventh data segment to the first data segment's position in the memory array wherein the arrangement of the plurality of data segments is maintained and
if the sixth bit length is less than the first bit length and greater than the fifth bit length,
extracting n bits, where n equals the fifth bit length, from the sixth data segment;
appending a number of padding bits to the first n bits to produce an eighth data segment having an eighth bit length equal to the first bit length, and writing the eighth data segment to the first data segment's position in the memory array wherein the arrangement of the plurality of data segments is maintained.

44. The method of claim 43 further comprising:
writing, when the third bit length is greater than the first bit length, a first portion of the third data segment to the first data segment's position in the memory array wherein the arrangement of the plurality of data segments is maintained and writing a second portion of the third data segment in metadata associated with the first data segment's position in the memory array.

45. The method of claim 44 wherein the first and second portions constitute the third data segment in its entirety.

46. The method of claim 43 further comprising:
writing, when the sixth bit length is greater than the first bit length, a first portion of the sixth data segment to the first data segment's position in the memory array wherein the arrangement of the plurality of data segments is maintained and writing a second portion of the sixth data segment and the value in metadata associated with the first data segment's position in the memory array.

47. The method of claim 46 wherein the first and second portions constitute the sixth data segment in its entirety.

48. The method of claim 43 further comprising:
reading the third data segment from the memory array; and
performing a hash function on the third data segment to obtain the first data segment.

49. The method of claim 44 further comprising:
reading the first portion of the third data segment from the first data segment's position in the memory array and the second portion of the third data segment from the metadata;
concatenating the first and second portions to form the third data segment; and
performing a hash function on the third data segment to obtain the first data segment.

50. The method of claim 43 further comprising:
storing the value in metadata associated with the first data segment's position in the memory array.

51. The method of claim 50 further comprising:
reading the value from the metadata; and
if the value indicates that the first data segment was compressed,
reading a number of bits equal to the sixth bit length from the first data segment's position in the memory array,
performing a hash function on the sixth number of bits to obtain the fifth data segment,
reading a second number of bits equal to the fourth bit length from the fifth data segment,
separating the integer and the second data segment from the second number of bits and
inputting the second data segment, the integer and the value into a decompression algorithm that is the inverse of a compression algorithm used to compress the first data segment to produce the first data segment.

52. The method of claim 45 further comprising:
reading the first portion of the sixth data segment from the first data segment's position in the memory array;
reading the second portion of the sixth data segment and the value from the metadata;
concatenating the first and second portions to form the sixth data segment; and
performing a hash function to obtain the fifth data segment and the integer,
computing the fourth bit length using the integer and the minimum input size, using the computed fourth bit length to extract the fourth data segment from the fifth data segment,
extracting the last integer bits from the fourth data segment to obtain the second data segment, and
inputting the second data segment, the integer and the value into a decompression algorithm that is the inverse of a compression algorithm used to compress the first data segment to produce the first data segment.

53. The method of claim 43 further comprising:
storing the last y bits of the sixth data segment, where y equals the sixth bit length minus the fifth bit length, in metadata associated with the first data segment's position in the memory array.

54. The method of claim 53 further comprising:
reading the n bits from the eighth data segment in the memory array;
reading the y bits from the metadata;
concatenating the n bits and the y bits to form the sixth data segment; and
performing a hash function on the sixth data segment to obtain the fifth data segment and the integer,
computing the fourth bit length using the integer and the minimum input size,
using the computed fourth bit length to extract the fourth data segment from the fifth data segment,
extracting the last integer bits from the fourth data segment to obtain the second data segment, and
inputting the second data segment, the integer and the value into a decompression algorithm that is the inverse of a compression algorithm used to compress the first data segment to produce the first data segment.

* * * * *

UNITED STATES PATENT AND TRADEMARK OFFICE
CERTIFICATE OF CORRECTION

PATENT NO.       : 8,677,123 B1
APPLICATION NO.  : 11/441613
DATED            : March 18, 2014
INVENTOR(S)      : John Patrick McGregor and Matthew N. White It is certified that error appears in the above-identified patent and that said Letters Patent is hereby corrected as shown below:

In the Claims:

Column 22, Line 7 (Claim 42): delete "first".

Column 22, Line 65 (Claim 43): delete "first".

Signed and Sealed this
Ninth Day of June, 2015

Michelle K. Lee
*Director of the United States Patent and Trademark Office*